(12) United States Patent
Peisa et al.

(10) Patent No.: US 11,178,639 B2
(45) Date of Patent: Nov. 16, 2021

(54) METHOD AND ARRANGEMENT FOR ACCESSING A COMMUNICATION NETWORK

(71) Applicant: Telefonaktiebolaget LM Ericsson (publ), Stockholm (SE)

(72) Inventors: Janne Peisa, Espoo (FI); Pål Frenger, Linköping (SE); Johan Rune, Lidingö (SE); Henning Wiemann, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 534 days.

(21) Appl. No.: 15/766,264

(22) PCT Filed: Jan. 23, 2018

(86) PCT No.: PCT/SE2018/050045
§ 371 (c)(1),
(2) Date: Apr. 5, 2018

(87) PCT Pub. No.: WO2018/143866
PCT Pub. Date: Aug. 9, 2018

(65) Prior Publication Data
US 2020/0245293 A1 Jul. 30, 2020

Related U.S. Application Data

(60) Provisional application No. 62/454,123, filed on Feb. 3, 2017.

(51) Int. Cl.
*H04W 72/00* (2009.01)
*H04W 4/90* (2018.01)
(Continued)

(52) U.S. Cl.
CPC .......... *H04W 72/005* (2013.01); *H04W 4/90* (2018.02); *H04W 74/0833* (2013.01); *H04W 76/11* (2018.02); *H04W 84/042* (2013.01)

(58) Field of Classification Search
None
See application file for complete search history.

(56) References Cited

U.S. PATENT DOCUMENTS

| 2010/0227611 A1 | 9/2010 | Schmidt et al. |
| 2015/0092654 A1 | 4/2015 | Ahmavaara |

(Continued)

FOREIGN PATENT DOCUMENTS

| CN | 104853411 A | 8/2015 |
| EP | 3169109 A1 | 5/2017 |
| WO | 2017150863 A1 | 9/2017 |

OTHER PUBLICATIONS

3GPP, "3rd Generation Partnership Project; Technical Specification Group Radio Access Network; Study on New Radio Access Technology; Radio Interface Protocol Aspects (Release 14)", 3GPP TR 38.804 V0.4.0, Nov. 2016, 1-30.

(Continued)

*Primary Examiner* — Jeffrey M Rutkowski
*Assistant Examiner* — Basil Ma
(74) *Attorney, Agent, or Firm* — Murphy, Bilak & Homiller, PLLC

(57) ABSTRACT

The present disclosure relates in general to cellular radio network communication. In one of its aspects, the technology presented herein concerns a method in a wireless device for accessing a communication network. Minimum system information associated with a cell and broadcasted from a network node in the communication network is received, wherein the minimum system information comprises a Public Land Mobile Network identity (PLMN ID) list and an indication that at least one additional PLMN is supported by the communication network. If any of the PLMN IDs in the received minimum system information corresponds to an allowed PLMN ID, the communication network is accessed. If no PLMN ID received in the minimum system informa- (Continued)

tion corresponds to an allowed PLMN ID, a request for on-demand system information comprising the at least one additional PLMN is sent to the network node.

20 Claims, 5 Drawing Sheets

(51) Int. Cl.
*H04W 76/11* (2018.01)
*H04W 74/08* (2009.01)
*H04W 84/04* (2009.01)

(56) References Cited

U.S. PATENT DOCUMENTS

| | | | | |
|---|---|---|---|---|
| 2017/0251500 | A1* | 8/2017 | Agiwal | H04W 74/0833 |
| 2018/0103369 | A1* | 4/2018 | Chou | H04L 27/2613 |
| 2018/0220361 | A1* | 8/2018 | Cheng | H04L 5/0091 |
| 2019/0223094 | A1* | 7/2019 | Ingale | H04W 48/10 |
| 2019/0394708 | A1* | 12/2019 | Damnjanovic | H04W 36/00837 |

OTHER PUBLICATIONS

Unknown, Author, "Contents of System information", 3GPP TSG-RAN WG2 Meeting NR ad-hoc, R2-1700570, Spokane, USA, Jan. 17-19, 2017, 1-4.

Unknown, Author, "Minimum System Information", 3GPP TSG-RAN WG2 NR AdHoc Meeting, R2-1700338, Intel Corporation, Spokane, USA, Jan. 17-19, 2017, 6 pages.

Unknown, Author, "System Information Change Procedure", 3GPP TSG-RAN WG2 NR Ad Hoc, R2-1700268, ETRI, Spokane, USA, Jan. 17-19, 2017, 3 pages.

Unknown, Author, "Text Proposal to TR 38.804 capturing the latest agreements on system information", 3GPP TSG-RAN WG2 #97, R2-1700660, Athens, Greece, Feb. 13-17, 2017, 1-3.

* cited by examiner

METHOD AND ARRANGEMENT FOR ACCESSING A COMMUNICATION NETWORK

TECHNICAL FIELD

The present disclosure relates in general to cellular radio network communication and in particular to the development within 3GPP 5G New Radio (NR) but may also be applicable to other radio communication systems. For example, the present disclosure presents technologies related to on-demand Public Land Mobile Network identity (PLMN ID) lists.

BACKGROUND

This section is intended to provide a background to the various embodiments of the invention that are described in this disclosure. Therefore, unless otherwise indicated herein, what is described in this section should not be interpreted to be prior art by its mere inclusion in this section.

One of the design goals of the New Radio (NR) for 5G is to support lean carrier operation, where only absolutely necessary information is transmitted, preferably in a dedicated manner to the User Equipment (UE). This design goal has large impact on the design of the system information (SI) mechanisms for NR, as system information in general is always transmitted and broadcast to all UEs in a cell. Furthermore, system information and initial access design is not as easy to modify or enhance in later releases as features requiring primarily dedicated signaling.

In order to minimize the amount of system information, broadcast on-demand delivery of parts of the system information can be introduced.

FIG. 1 illustrates a high level concept of on-demand system information provisioning. System information is generally divided into minimum SI and other SI. Minimum SI is periodically broadcast 110. The minimum SI comprises basic information required for initial access to a cell and information for acquiring any other SI broadcast periodically or provisioned via on-demand basis i.e. scheduling information. The other SI encompasses everything not broadcast in the minimum SI.

The other SI may either be broadcast 120, or provisioned in a dedicated manner 130, either triggered by the network or upon request from the UE as illustrated in FIG. 1. For the other SI required by the UE, before the UE sends the other SI request the UE generally needs to know whether it is available in the cell and whether it is broadcast or not. The UE which is in either RRC_IDLE or RRC_INACTIVE state should be able to request the other SI without requiring a state transition. For the UE in RRC_CONNECTED, dedicated Radio Resource Control (RRC) signaling can be used for the request and delivery of the other SI. The other SI may be broadcast at configurable periodicity and for certain duration. It is network decision whether the other SI is broadcast or delivered through dedicated UE specific RRC signaling.

Each cell on which the UE is allowed to camp generally broadcasts at least some contents of the minimum SI, while there may be cells in the system on which the UE cannot camp and do not broadcast the minimum SI. For a cell or frequency that is considered for camping by the UE, the UE should not be required to acquire the minimum SI from the other cell or frequency layer. This does not preclude the case that the UE applies stored SI from previously visited cell(s). If the UE cannot determine the full minimum SI of a cell (e.g. by receiving from that cell or from valid stored SI from previous cells), the UE shall consider that cell as barred. It is desirable for the UE to learn very quickly that this cell cannot be camped on. Reception of the minimum SI via System Frame Number (SFN) is not precluded and pending the outcome of RAN1 study. Msg.1 and/or Msg.3 are/is used to carry the other SI request. An additional indication that an on-demand SI is actually being broadcast at this instant in time may or may not occur.

The contents of the system information handling may include the following:
- The minimum SI includes at least SFN, list of Public Land Mobile Network (PLMN), Cell ID, cell camping parameters, Random Access Channel (RACH) parameters.
- If network allows on demand mechanism, parameters required for requesting other SI-block(s), if any needed, e.g. RACH preambles for request, shall be included in minimum SI.
- Cell-reselection neighboring cell information is considered as Other SI.
- Public Warning System (PWS) information can be classified into the other SI.
- The scheduling information for the other SI includes System Information Block (SIB) type, validity information, SI periodicity and SI-window information and is provided irrespective of whether the other SI is periodically broadcast or not.
- For other SI, UE can request one or more SI-block(s) or all SI-blocks in a single request.
- For the other SI required by the UE, before the UE sends the other SI request the UE needs to know whether it is available in the cell and whether it is broadcast or not. This can be done by checking the minimum SI which provides the scheduling information for the other SI including SIB type, validity information, SI periodicity and SI-window information based on LTE.
- The scheduling information in minimum SI includes an indicator whether the concerned SI-block is periodically broadcasted or provided on demand. If minimum SI indicates that a SIB is not broadcasted, then the UE does not assume that this SIB is a periodically broadcasted in its SI-window at every SI periodicity. Therefore, the UE may send an SI request to receive this SIB.
- After sending the SI request, for receiving the requested SIB, the UE monitors the SI window of the requested SIB in one or more SI periodicities of that SIB.

SUMMARY

It is in view of the above background and other considerations that the various embodiments of the present disclosure have been made.

In view of the above, it is therefore a general object of the aspects and embodiments described throughout this disclosure to provide a solution where the size of the minimum system information is kept at a minimum, but without limiting the deployment options for NR.

This general object has been addressed by the appended independent claims. Advantageous embodiments are defined in the appended dependent claims.

According to a first aspect, there is provided a method in a wireless device for accessing a communication network.

Minimum system information associated with a cell and broadcasted from a network node in the communication network is received. The minimum system information comprises a Public Land Mobile Network identity (PLMN ID) list and an indication that at least one additional PLMN is supported by the communication network. If any of the PLMN IDs in the received minimum system information corresponds to an allowed PLMN ID, the communication network is accessed. If no PLMN ID received in the minimum system information corresponds to an allowed PLMN ID, a request for on-demand system information comprising the at least one additional PLMN is sent to the network node.

In one embodiment, the method additionally comprises receiving the requested on-demand system information transmitted from the network node. The communication network is accessed if any of the at least one additional PLMN IDs in the received on-demand system information corresponds to an allowed PLMN ID.

In one embodiment, the PLMN IDs in the minimum system information are compressed. The step of accessing the communication network if any of the PLMN IDs in the received list corresponds to an allowed PLMN ID then comprises matching a compressed version of PLMN IDs, allowed to be accessed by the wireless device, with each item in the list of compressed PLMN IDs received from the network node. If a match is found, a request is sent for an uncompressed PLMN ID of the matched compressed PLMN ID to the network node. The uncompressed PLMN ID is received from the network node, and the communication network corresponding to an allowed PLMN ID is accessed. The PLMN IDs may be compressed using a hash function, by taking the least significant bits of the PLMN ID, using a Bloom filter.

In one embodiment, the request for on-demand system information is a Physical Random Access Channel (PRACH) preamble.

According to a second aspect, there is provided a wireless device implementing the method according to the first aspect.

In one exemplary embodiment, the wireless device comprises transceiver circuitry, memory circuitry and processing circuitry. The processing circuitry is configured to control the memory and transceiver circuitry to receive minimum system information associated with a cell and broadcasted from a network node in the communication network. The minimum system information comprises a Public Land Mobile Network identity (PLMN ID) list and an indication that at least one additional PLMN is supported by the communication network. The processing circuitry is configured to control the memory and transceiver circuitry to access the communication network if any of the PLMN IDs in the received minimum system information corresponds to an allowed PLMN ID. If no PLMN ID received in the minimum system information corresponds to an allowed PLMN ID, the processing circuitry is configured to control the memory and transceiver circuitry to send a request for on-demand system information comprising the at least one additional PLMN to the network node.

In one embodiment, the processing circuitry of the wireless device is further configured to control the memory and the transceiver circuitry to receive the requested on-demand system information transmitted from the network node. If any of the at least one additional PLMN IDs in the received on-demand system information corresponds to an allowed PLMN ID, the processing circuitry is configured to control the memory and the transceiver circuitry to access the communication network.

In one embodiment, the PLMN IDs in the minimum system information are compressed. If any of the PLMN IDs in the received list corresponds to an allowed PLMN ID, the processing circuitry of the wireless device is further configured to control the memory and the transceiver circuitry to access the communication network by matching a compressed version of PLMN IDs, allowed to be accessed by the wireless device, with each item in the list of compressed PLMN IDs received from the network node. If a match is found, the processing circuitry is configured to control the memory and the transceiver circuitry to send a request for an uncompressed PLMN ID of the matched compressed PLMN ID to the network node. The processing circuitry is configured to control the memory and the transceiver circuitry to receive the uncompressed PLMN ID from the network node, and access the communication network corresponding to an allowed PLMN ID. The PLMN IDs may be compressed using a hash function, by taking the least significant bits of the PLMN ID, using a Bloom filter.

In one embodiment, the request for on-demand system information is a Physical Random Access Channel (PRACH) preamble.

In one embodiment, the wireless device is a User Equipment (UE).

According to a third aspect, there is provided a method in a network node for establishing connectivity and receiving data to and from a wireless device.

Minimum system information comprising a Public Land Mobile Network identity (PLMN ID) list and an indication that at least one additional PLMN is supported by the communication network is broadcasted. A request for on-demand system information is received from a wireless device. The requested on-demand system information comprising the at least one additional PLMN ID is then transmitted to the wireless device.

In one embodiment, the PLMN IDs in the minimum system information are compressed. The step of broadcasting minimum system information then comprises broadcasting the minimum system information comprising the list of compressed PLMN IDs. A request from the wireless device for an uncompressed PLMN ID is received, and the uncompressed PLMN ID is transmitted to the wireless device. The PLMN IDs may be compressed using a hash function, by taking the least significant bits of the PLMN ID, using a Bloom filter.

In one embodiment, the on-demand system information comprises a full list of all PLMN IDs duplicating ones present also in the minimum system information.

According to a fourth aspect, there is provided a network node for establishing connectivity and receiving data to and from a wireless device.

The network node comprises transceiver circuitry, memory circuitry and processing circuitry. The processing circuitry is configured to control the memory and transceiver circuitry to broadcast minimum system information comprising a PLMN ID list and an indication that at least one additional PLMN is supported by the communication network. The processing circuitry is configured to control the memory and transceiver circuitry to receive a request for on-demand system information from a wireless device, and transmit the requested on-demand system information comprising the at least one additional PLMN ID to the wireless device.

In one embodiment, the PLMN IDs in the minimum system information are compressed. The processing circuitry is then further configured to control the memory and the transceiver circuitry to broadcast the minimum system information comprising the list of compressed PLMN IDs by broadcast the minimum system information comprising the list of compressed PLMN IDs. The processing circuitry is configured to control the memory and transceiver circuitry to receive a request from the wireless device for an uncompressed PLMN ID, and transmit the uncompressed PLMN ID to the wireless device. The PLMN IDs may be compressed using a hash function, by taking the least significant bits of the PLMN ID, using a Bloom filter.

In one embodiment, the on-demand system information comprises a full list of all PLMN IDs duplicating ones present also in the minimum system information.

In one embodiment, the network node is a gNB.

According to a fifth aspect, there is provided a method in a communication system for providing data communication between a service provider and a wireless device, comprising first communications interface, first processing circuitry, second communications interface and second processing circuitry.

The first processing circuitry is configured to control the first communications interface to send and receive data to and from the second communications interface, the second processing circuitry is configured to control the second communications interface to send and receive data to and from the first communications interface. The second processing circuitry is configured to execute the steps of the method in the wireless device according to the first aspect.

According to a sixth aspect, there is provided a communication system for providing data communication between a service provider and a wireless device, comprising first communications interface, first processing circuitry, second communications interface and second processing circuitry.

The first processing circuitry is configured to control the first communications interface to send and receive data to and from the second communications interface, the second processing circuitry is configured to control the second communications interface to send and receive data to and from the first communications interface, and wherein the second processing circuitry and the second communications interface is arranged in, and configured according to the wireless device according to the second aspect.

Given the ambition to keep the size of the minimum system information at minimum, the agreement to include list of PLMNs it particularly problematic. Based on some estimates the size of the minimum system information might be of the order of 200-400 bits of which the PLMN identity (PLMN ID) list consists of up to 144 bits.

| NR SI for sub6 & mmWave | Estimated size (bits) | Source in LTE | comments |
|---|---|---|---|
| dl-Bandwidth | 3 | LTE MIB | |
| subcarrier spacing | 3 | N/A | |
| bandOffset (TBD) | 4 | N/A | mmW specific: offset of xSS in band |
| system frame number | 8 | LTE MIB | |
| PLMN identity | Up to 6 × 24 (max 6 PLMNs) | LTE SIB1 | cellAccessRelateInfo |
| cell Identity | 28 | LTE SIB1 | cellAccessRelateInfo |
| trackingAreaCode | 16 | LTE SIB1 | cellAccessRelateInfo |
| notifcationAreaCode (TBD) | TBD | N/A | For RRC-INACTIVE state |
| cell barring | 1 | LTE SIB1 | cellAccessRelateInfo |
| CSG indicator | 1 | LTE SIB1 | cellAccessRelateInfo |
| CSG identity | 27 | LTE SIB1 | cellAccessRelateInfo |
| IntraFreqReselection | 1 | LTE SIB1 | cellAccessRelateInfo |
| q-RxLevMin | 6 | LTE SIB1 | cellSelectionInfo |
| qRxLevMinOffset | 3 | LTE SIB1 | cellSelectionInfo |
| p-Max | 6 | LTE SIB1 | cellSelectionInfo |
| FreqBandIndicator | 6 | LTE SIB1 | |
| ac-BarringForEmergency | 1 | LTE SIB2 | ac-BarringInfo |
| ac-BarringForMO-Signalling | 12 | LTE SIB2 | ac-BarringInfo |
| ac-BarringForMO-Data | 12 | LTE SIB2 | ac-BarringInfo |
| Value tag for SI | 5 | LTE SIB1 | |
| Scheduling information for broadcasted SIs | TBD | LTE SIB1 | Information to acquire other SIs |
| PRACH configuration for on-demand SIs | TBD | LTE SIB2 | Information to acquire other SIs |

The size of the PLMN ID list depends purely on the number of operators sharing the network. The current maximum of 6 operators is probably sufficient for existing deployments, but for many new use cases using neutral hosts to share the network, even more PLMN identities might be needed, which would increase the amount of broadcast signaling even further.

If the NR network is shared between operators, the size of the PLMN ID list grows, and it may not be feasible to transmit it as part of the minimum system information. This limits the deployment options for NR, and may not allow for new business models such as neutral hosting.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Various aspects of the present invention will now be described, by way of example, based on embodiments with reference to the accompanying drawings, wherein.

DETAILED DESCRIPTION

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to convey the scope of the inventive concept to those skilled in the art. Like numbers refer to like elements throughout the description.

According to certain embodiments of the present disclosure, in addition to the PLMN ID list broadcast in the minimum system information, the UE may receive an indication that there are also additional PLMN IDs supported by the network. The UE may then perform a request for other system information, i.e. on-demand system information, and receives the full list of PLMN IDs in response to said request, even though the UE may not be able to access the cell based on the PLMN IDs received in the minimum system information, by receiving additional PLMN IDs, or a full list of available PLMN IDs the UE may use find a PLMN ID which it can use to access the network.

Providing the full PLMN ID list using on-demand mechanism allows the system to support a large number of operators sharing the network. This is especially valuable for new use cases, e.g. for neutral host solutions.

In one of its aspects, the technology presented herein concerns a method implemented in a wireless device for accessing a communication network.

Figure 1:
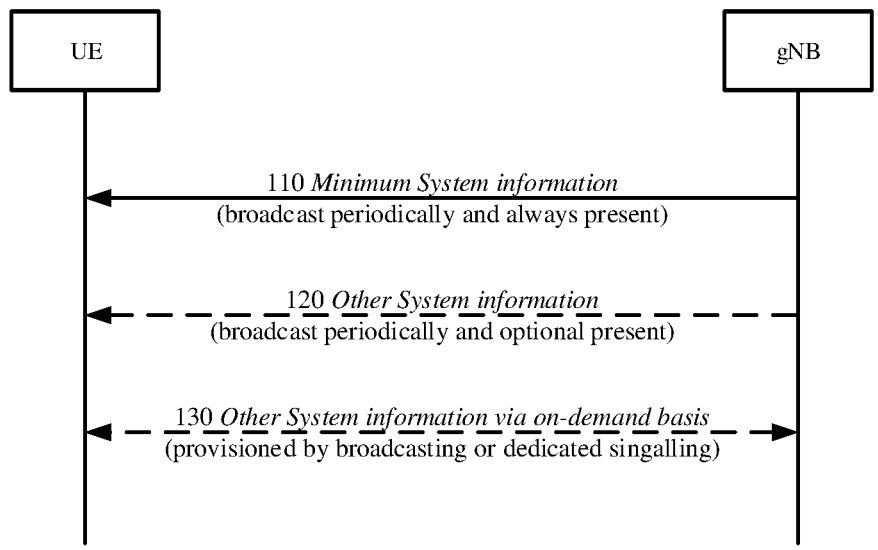
FIG. 1 illustrates a high level concept of on-demand SI provisioning.
Figure 2:
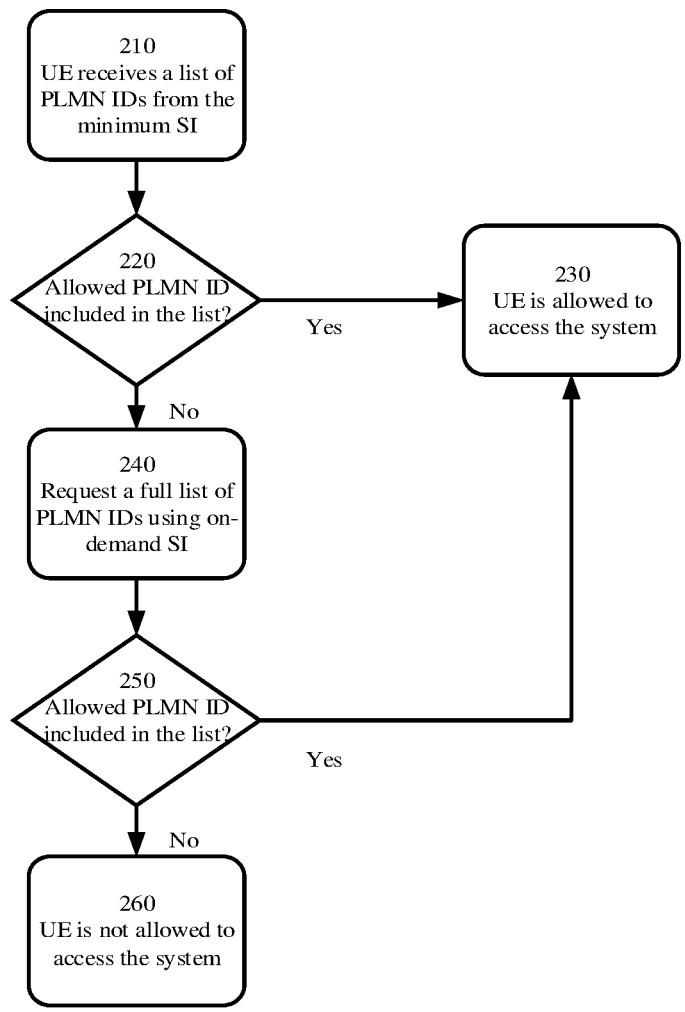
FIG. 2 shows a flowchart of an example method performed by a UE.

An embodiment will now be described with reference to FIG. 2. FIG. 2 shows a flowchart wherein a network node, such as a gNB, broadcasts, in the minimum system information associated with a cell, a partial list of PLMN IDs and an indication that there are additional PLMN IDs supported by the communication network available using on-demand system information. The partial list may comprise (e.g. contain) the most common PLMN IDs used in the network, so that most of the UEs can access the system only by receiving the minimum system information.

The UE receives the minimum system information and the partial list of PLMN IDs 210, and checks if any of the PLMN IDs corresponds to suitable (i.e. allowable) PLMNs so that the UE can access the system 220. If the list of PLMN IDs contains a suitable PLMN ID, the UE can immediately access the system 230.

If the list of PLMN IDs does not contain a suitable (i.e. allowable) PLMN ID, the UE determines whether the list of additional PLMN IDs is available upon request, and if so, the UE requests the full list of PLMN IDs using on-demand system information mechanism 240. Note that according to the on-demand mechanism, the UE may transmit a request for on-demand system information, or the UE may simply detect that the NW is broadcasting a full list of PLMN IDs.

The gNB provides the additional PLMN IDs using on-demand system information. Note that gNB may freely choose to broadcast also the system information message comprising the additional PLMN IDs continuously, or in another embodiment only upon receiving a request for on-demand system information from the UE. The UE checks 250 if any of the PLMN IDs in the on-demand system information corresponds to suitable PLMNs so that the UE can access the system. If the list of PLMN IDs comprises a suitable PLMN ID, the UE may access the system 230. If the list of PLMN IDs does not comprise an allowed PLMN ID, the UE is not allowed to access the system.

In one embodiment the request for a full list of PLMN IDs is an uplink signal. This uplink signal may be a Physical Random Access Channel (PRACH) preamble i.e. a random access preamble dedicated for this purpose, or a signal similar to a PRACH preamble. In one embodiment this preamble is transmitted on the regular PRACH resources; in another embodiment the preamble is transmitted on PRACH resources configured to be dedicated for this purpose. The preamble may be enough to trigger transmission of the full list of PLMN IDs, but it is also conceivable to make the preamble trigger a response e.g. a response similar to a Random Access Response signal, which in turn triggers and allocates uplink transmission resources to be used by the UE to send another message which will trigger the transmission of the full list of PLMN IDs. In one embodiment, resources for transmitting the uplink signal are allocated or configured to always occur in close proximity after the transmission of the partial list of PLMN IDs, so that a UE, which needs the full list of PLMN IDs quickly can request it after discovering the need for it.

Figure 3:
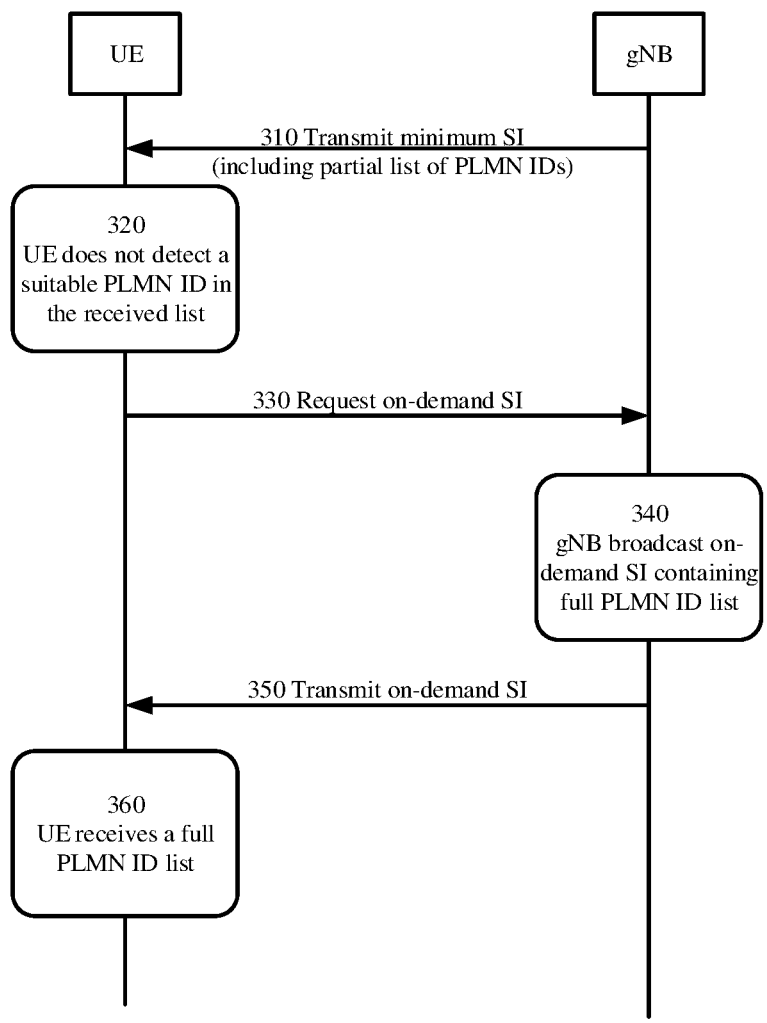
FIG. 3 illustrates a signalling diagram of an example embodiment.

The above-described embodiment may also be described with reference to the signalling diagram illustrated in FIG. 3. FIG. 3 shows how a network node, e.g. a gNB, may transmit, e.g. broadcast, minimum system information to a wireless device, e.g. a UE, 310. The minimal system information may include a partial list of PLMN IDs and an indication that there are additional PLMN IDs available using on-demand system information. The UE receive the list and may detect whether a suitable PLMN ID is found in the received list or not. If the UE does not detect a suitable PLMN ID is the received list 320, the UE may send a request for on-demand system information to the gNB, which receives the request, 330. The gNB may broadcast the on-demand system information comprising (e.g. containing) a full PLMN ID list 340 and the on-demand system information may be transmitted to the UE 350. The UE accordingly may receive the full PLMN ID list 360.

According to one embodiment the Network (NW) provides a full list of all PLMN IDs duplicating ones present also in the minimum system information, on demand. In another embodiment the NW provides a list of additional PLMN IDs in the on-demand system information.

The partial and additional PLMN ID lists may comprise (e.g. contain) additional parameters per PLMN ID, such as tracking area code, global cell ID, barring parameters, or indications of possible additional PLMN specific SIBs that may be requested on demand, as well as configuration of how they can be requested, e.g. associated preambles to be transmitted as requests, as well as associated scheduling information which is valid when the SIBs are transmitted on request.

The network node, e.g. a gNB, may include a list of compressed PLMN IDs in the minimum system information. The compressed PLMN IDs can be created e.g. by using a hash function on the PLMN IDs, by taking the least significant bits of the PLMN IDs or by other means. The UE can then check if the hash value for any of its allowed PLMN IDs matches any of the entries in the list of compressed PLMN IDs, and only request the full list of PLMN IDs if this is the case. In one embodiment the minimum SI can associate a request method, e.g. a preamble, with each of the compressed PLMN IDs and if the UE finds a match between one of its allowed PLMN IDs and one of the compressed PLMN IDs, it can request the full, uncompressed, version of only that specific PLMN ID. The above description of the various options for what such a request may consist of and resources for its transmission is valid in this case too. If the request consists of a PRACH preamble or similar, then one preamble may be allocated to be dedicated for request of each PLMN ID in the compressed list, i.e. it would be associated with one of the compressed PLMN IDs indicating that this preamble should be used for request of the full PLMN ID corresponding to this compressed PLMN ID. If the uplink signal triggers a response which in turn triggers and allocates resources for a second message from the UE, then the UE can indicate in this second message which compressed PLMN ID it wants the full PLMN ID for.

Another advantageous means for compressing the list of PLMN IDs is a Bloom filter. A Bloom filter can provide fool proof negative responses, i.e. indicating that a certain PLMN ID is not included in the list, but will give a certain false positive rate, which depends on the number of bits allocated to the Bloom filter, the number of bits of each item the Bloom filter encodes and the number of such items. In general, the Bloom filter is a compact and efficient tool when these properties are desired or acceptable. The UE would try each of its allowed PLMN IDs against the Bloom filter and if at least one of them matches, i.e. at the first match, the UE requests the full PLMN ID list and any associated parameters as mentioned above.

A matching compressed PLMN ID does not indicate with 100% certainty that the UE will be allowed to access the network, but a non-matching compressed PLMN ID indicates to the UE that there is no point to request the full list of additional PLMN IDs.

In one variation of the solution, the minimum SI only comprises (e.g. contains) compressed PLMN IDs, e.g. a compressed version of the full PLMN ID list, e.g. using a Bloom filter. Uncompressed PLMN IDs are only available on demand in this variation.

Figure 4:
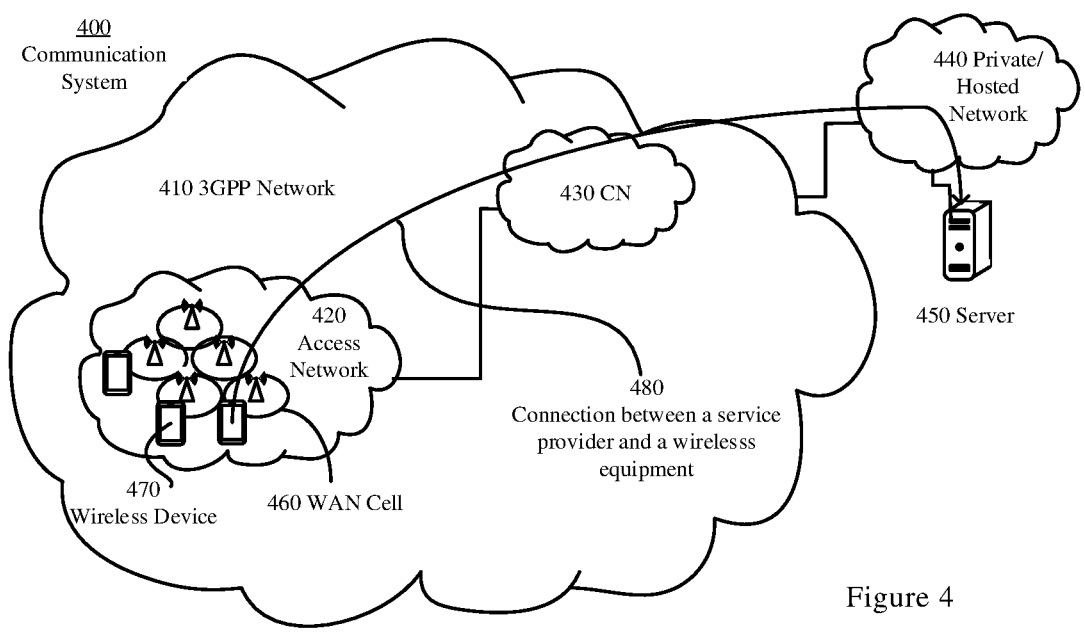
FIG. 4 shows a communication network.

Although the solutions described above may be implemented in any appropriate type of system using any suitable components, particular embodiments of the described solutions may be implemented in a network configuration such as the example communication network illustrated in FIG. 4.

In the example embodiment disclosed in FIG. 4, a connection is established between a server 450, such as a media server of a service provider etcetera, and a wireless device 470, as is shown by the connection arrow 480, through and by a private/hosted network 440, a Core Network (CN) 430 and a cellular wireless access network 420 comprising several cells 460. The CN 430 and the access network 420 are indicated to be 3GPP compliant networks 410, however it should be noted that it is possible to establish connectivity between the server 450 and the wireless device 470 using non-3GPP wireless networks such as for instance a WiFi network. In some embodiments the server 450 is configured to provide the wireless device 470 with data over the established connection, in other embodiments the wireless device 470 provides the server 450 with data and in yet other embodiments the wireless device 470 and server 450 provide each other with data.

The data may be both user plane data and control plane data. Control plane data can be used by the wireless device and server for configuration, and user plane data are providing information from and to respective part. Example of user plane data can for instance be voice, video or other type of data primarily used for consumption on either end.

The communication system 400 illustrated in FIG. 4 is suitable for providing data transport between a service provider and a wireless device 470, such as a User Equipment (UE), an Internet of Things (IoT) device and several other types of devices utilizing the wireless connectivity provided in part by the wireless network and in part of the CN 430, private/hosted network 440 and server 450.

The communication system 400 provides a number of required and optional features for delivering secure, fast and flexible data transport such as Mobility, Authentication, Charging, Low Latency, High Availability etcetera.

Figure 5:
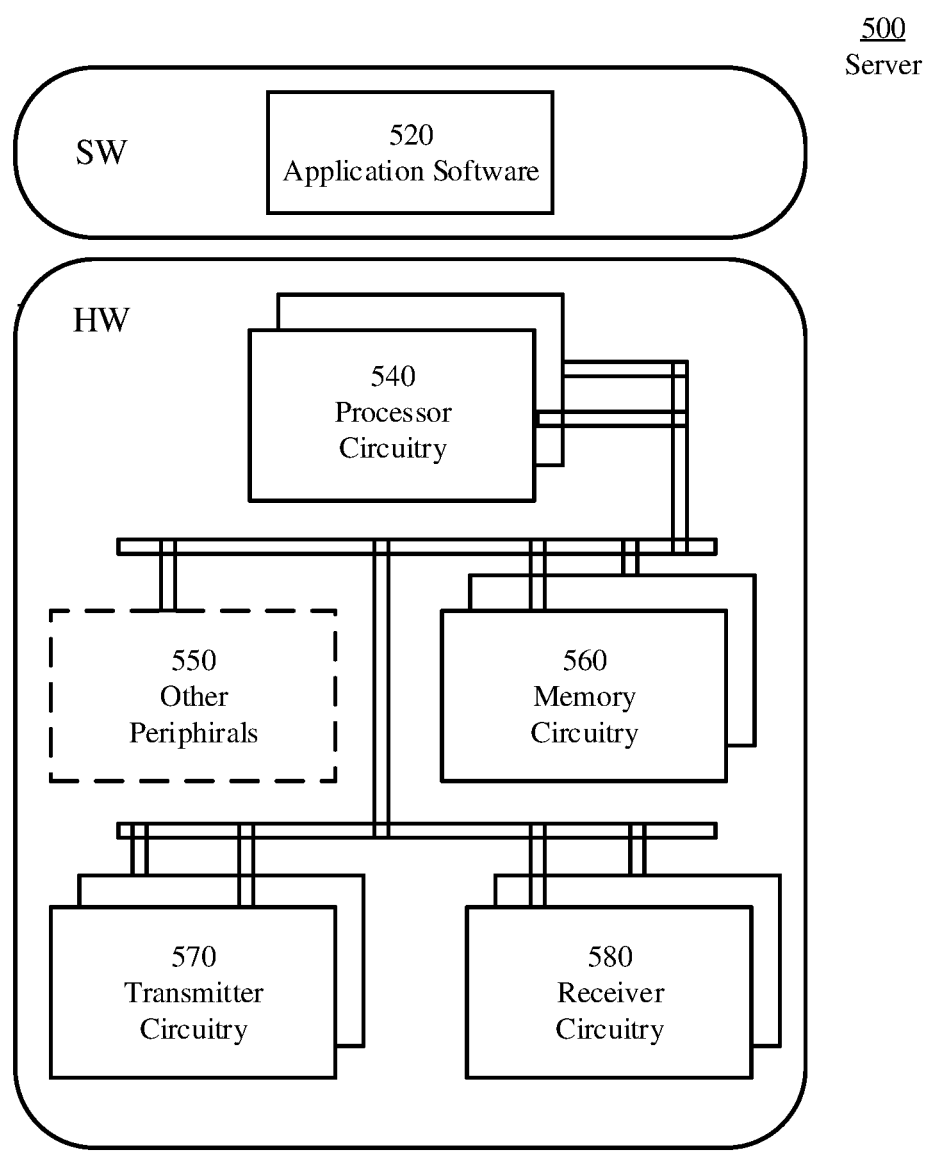
FIG. 5 shows a server according to an embodiment.

Although the solutions described above may be implemented in any appropriate type of system using any suitable components, particular embodiments of the described solutions may be at least partly implemented in a server illustrated in FIG. 5.

The server 500 is provided with communications interface for sending and receiving data to and from the wireless device. The communications interface comprises in one embodiment at least one, but in some embodiment multiple receiver circuitry 580, transmitting circuitry 570 and processing circuitry 540 for controlling the transceiver. In other embodiments the communications interface is configured also for sending and receiving data over wired networks. Thus the term communications interface should be construed to include embodiments where communications is facilitated in wireless mode, in wired mode or in both wireless and wired mode. A communication interface may consequently comprise features supporting multiple simultaneous communication channels. The server 500 is further provided with processing circuitry 540 coupled to memory circuitry 560 and the said transceiver circuitry for controlling the server 500 and executing software applications 520 running on the server 500, such as software application 520 implementing at least parts of the solutions disclosed herein.

The server 500 may also be fitted with other circuitry for performing various services, functions and processing as needed to fulfill and comply with the features required for providing the requested services. The application software 520 is running on the processing circuitry 540, controlling the memory 560 and communications interface and will generate and send data to the wireless device as well as receive, analyze, store and consume data from the wireless device. In one embodiment the software application 520 may be hosted in a cloud environment and will then share hardware with other software applications possibly from other enterprises.

The processing circuitry 540 may be configured to perform any determining operations described herein as being performed by a wireless device/network node. Determining as performed by processing circuitry 540 may include processing information obtained by the processing circuitry 540 by, for example, converting the obtained information into other information, comparing the obtained information or converted information to information stored in the wireless device/network node, and/or performing one or more operations based on the obtained information or converted information, and as a result of said processing making a determination.

The processing circuitry 540 may be configured to perform any comparison operations described herein as being performed by a wireless device/network node. Comparison as performed by processing circuitry 540 may include processing information obtained by the processing circuitry 540 by, for example, converting the obtained information into other information, performing one or more operations based on the obtained information or converted information and information stored in the wireless device/network node wherein one of the obtained information or converted information and the information in the wireless device/network node is selected based on a criteria, such as being biggest or smallest, coming first or last, or being wherein the obtained information or converted information is sorted according to a criteria, such as in biggest to smallest order, smallest to biggest order, or any other suitable order. Comparison as performed by processing circuitry 540 may include processing information obtained by the processing circuitry 540 by, for example, converting the obtained information into other information, and setting a flag based on the obtained information or converted information and information stored in the wireless device/network node wherein the flag indicates the result of the comparison.

The processing circuitry 540 may be configured to perform any matching operations described herein as being performed by a wireless device/network node. Matching as performed by processing circuitry 540 may include processing information obtained by the processing circuitry 540 by, for example, converting the obtained information into other information, and setting a flag based on the obtained information or converted information and information stored in the wireless device/network node wherein the flag indicates if the matching was successful or not, that is if the obtained information or the converted information is equal to the information stored in the wireless device/network node according to a criteria. The criteria may for instance be if two numerical values are same, if a difference between two numerical values are smaller than a third value, if two alphanumeric values are same, if two arbitrarily long strings of alphanumeric values are same, if the first or last number of characters in two arbitrarily long strings are same, if two objects in an object oriented software language are of same type etcetera.

Figure 6:
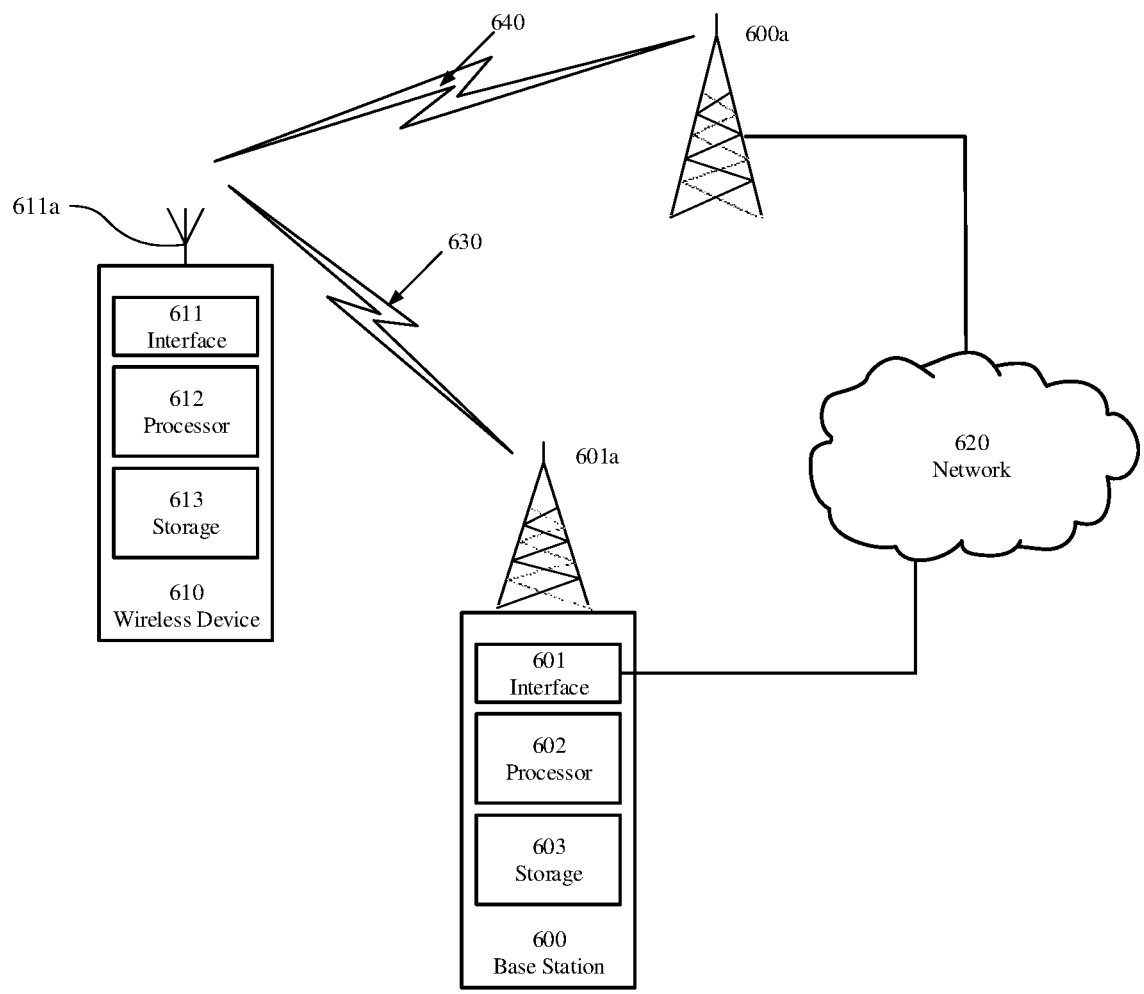
FIG. 6 illustrates an example wireless communication network.

Although the solutions described above may be implemented in any appropriate type of system using any suitable components, particular embodiments of the described solutions may be implemented in a wireless network such as the example wireless communication network illustrated in FIG. 6. In the example embodiment of FIG. 6, the wireless communication network provides communication and other types of services to one or more wireless devices 61*o*. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

Network 620 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 6 illustrates a wireless network comprising a more detailed view of network node 600 and wireless device (WD) 610, in accordance with a particular embodiment. For simplicity, FIG. 6 only depicts network 620, network nodes 600 and 600*a*, and WD 610. Network node 600 comprises processor 602, storage 603, interface 601, and antenna 601*a*. Similarly, WD 610 comprises processor 612, storage 613, interface 611 and antenna 611*a*. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, evolved Node Bs (eNBs) and gNBs. Base stations may be categorized based on the amount of coverage they provide or, stated differently, their transmit power level and may then also be referred to as femto base stations, pico base stations, micro base stations, or macro base stations. "Network node" also includes one or more, or all, parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to the wireless communication network or to provide some service to a wireless device that has accessed the wireless communication network.

As used herein, the term "radio node" is used generically to refer both to wireless devices and network nodes, as each is respectively described above.

In FIG. 6, Network node 600 comprises processor 602 (e.g. a processing circuitry), storage 603 (e.g. a memory circuitry), interface 601 (e.g. a transceiver circuitry), and antenna 601a. These components are depicted as single boxes located within a single larger box. In practice however, a network node may comprise multiple different physical components that make up a single illustrated component (e.g., interface 601 may comprise terminals for coupling wires for a wired connection and a radio transceiver for a wireless connection). As another example, network node 600 may be a virtual network node in which multiple different physically separate components interact to provide the functionality of network node 600 (e.g., processor 602 may comprise three separate processors located in three separate enclosures, where each processor is responsible for a different function for a particular instance of network node 600). Similarly, network node 600 may be composed of multiple physically separate components (e.g., a NodeB component and a RNC component, a BTS component and a BSC component, etc.), which may each have their own respective processor, storage, and interface components. In certain scenarios in which network node 600 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 600 may be configured to support multiple radio access technologies (RATs). In such embodiments, some components may be duplicated (e.g., separate storage 603 for the different RATs) and some components may be reused (e.g., the same antenna 601a may be shared by the RATs).

Processor 602 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 600 components, such as storage 603, network node 600 functionality. For example, processor 602 may execute instructions stored in storage 603. Such functionality may include providing various wireless features discussed herein to a wireless device, such as WD 610, including any of the features or benefits disclosed herein.

Storage 603 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 603 may store any suitable instructions, data or information, including software and encoded logic, utilized by network node 600. Storage 603 may be used to store any calculations made by processor 602 and/or any data received via interface 601.

Network node 600 also comprises interface 601 which may be used in the wired or wireless communication of signalling and/or data between network node 600, network 620, and/or WD 610. For example, interface 601 may perform any formatting, coding, or translating that may be needed to allow network node 600 to send and receive data from network 620 over a wired connection. Interface 601 may also include a radio transmitter and/or receiver that may be coupled to or a part of antenna 601a. The radio may receive digital data that is to be sent out to other network nodes or WDs via a wireless connection. The radio may convert the digital data into a radio signal having the appropriate channel and bandwidth parameters. The radio signal may then be transmitted via antenna 601a to the appropriate recipient (e.g., WD 610).

Antenna 601a may be any type of antenna capable of transmitting and receiving data and/or signals wirelessly. In some embodiments, antenna 601a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" (WD) refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3$^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication, and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 6, WD 610 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 600 and/or other WDs. WD 610 comprises processor 612 (e.g. processing circuitry), storage 613 (e.g. memory circuitry), interface 611 (e.g. transceiver circuitry), and antenna 611a. Like network node 600, the components of WD 610 are depicted as single boxes located within a single larger box, however in practice a wireless device may comprises multiple different physical components that make up a single illustrated component (e.g., storage 613 may comprise multiple discrete microchips, each microchip representing a portion of the total storage capacity).

Processor 612 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 610 components, such as storage 613, WD 610 functionality. Such functionality may include providing various wireless features discussed herein, including any of the features or benefits disclosed herein.

Storage 613 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 613 may store any suitable data, instructions, or information, including software and encoded logic, utilized by WD 610. Storage 613 may be used to store any calculations made by processor 612 and/or any data received via interface 611.

Interface 611 may be used in the wireless communication of signalling and/or data between WD 610 and network node 600. For example, interface 611 may perform any formatting, coding, or translating that may be needed to allow WD 610 to send and receive data from network node 600 over a wireless connection. Interface 611 may also include a radio transmitter and/or receiver that may be coupled to or a part of antenna 611a. The radio may receive digital data that is to be sent out to network node 601 via a wireless connection. The radio may convert the digital data into a radio signal having the appropriate channel and bandwidth parameters. The radio signal may then be transmitted via antenna 611a to network node 600.

Antenna 611a may be any type of antenna capable of transmitting and receiving data and/or signals wirelessly. In some embodiments, antenna 611a may comprise one or more omni-directional, sector or panel antennas operable to transmit/receive radio signals between 2 GHz and 66 GHz. For simplicity, antenna 611a may be considered a part of interface 611 to the extent that a wireless signal is being used.

Figure 7:
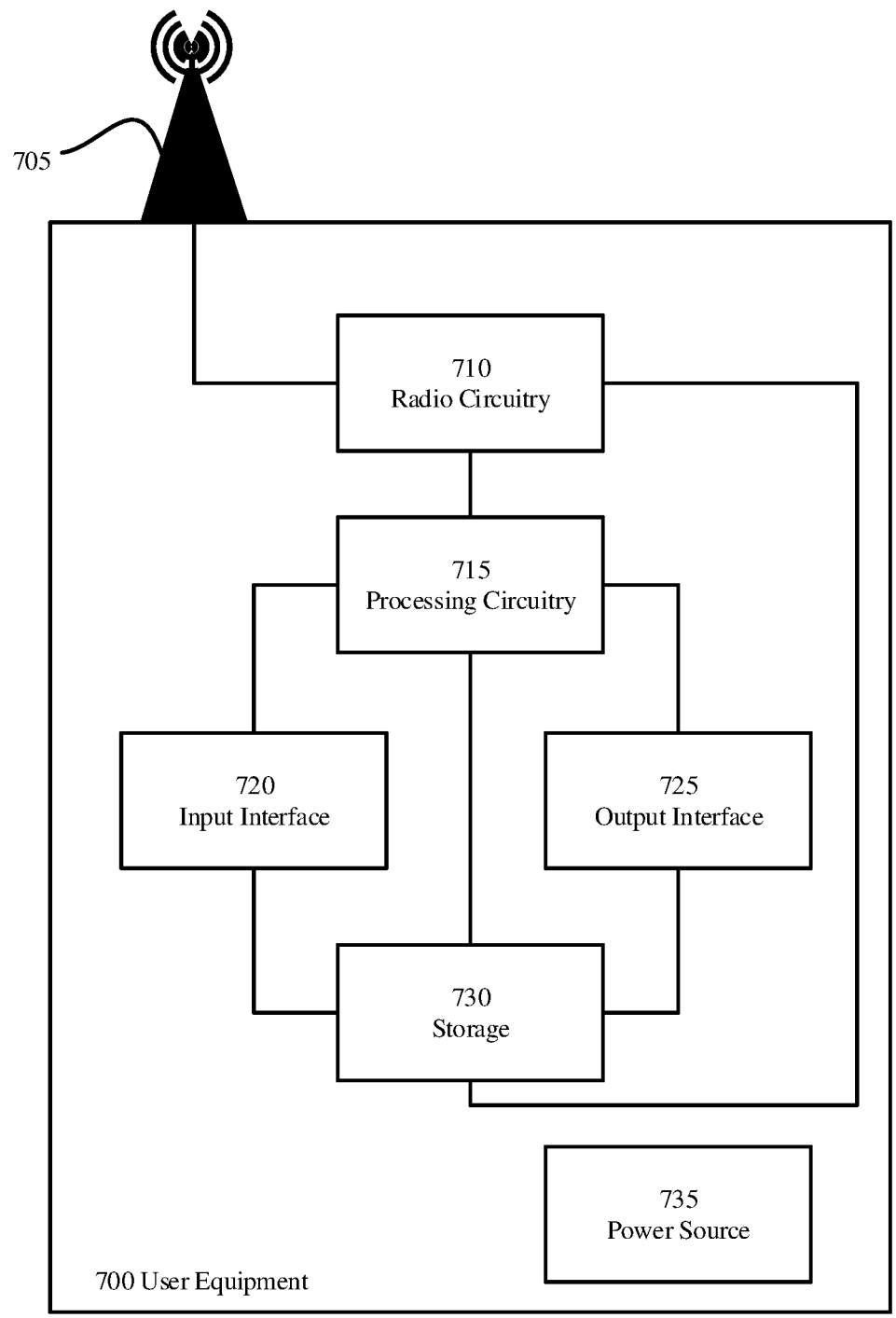
FIG. 7 shows a user equipment according to one embodiment.

As shown in FIG. 7, user equipment 700 is an example wireless device. UE 700 includes an antenna 705, radio front-end circuitry 710, processing circuitry 715, and a computer-readable storage medium (e.g. a memory circuit) 730. Antenna 705 may include one or more antennas or antenna arrays, and is configured to send and/or receive wireless signals, and is connected to radio front-end circuitry 710. In certain alternative embodiments, wireless device 700 may not include antenna 705, and antenna 705 may instead be separate from wireless device 700 and be connectable to wireless device 700 through an interface or port.

The radio front-end circuitry 710 may comprise various filters and amplifiers, is connected to antenna 705 and processing circuitry 715, and is configured to condition signals communicated between antenna 705 and processing circuitry 715. In certain alternative embodiments, wireless device 700 may not include radio front-end circuitry 710, and processing circuitry 715 may instead be connected to antenna 705 without radio front-end circuitry 710.

Processing circuitry 715 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 715 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 715 executing instructions stored on a computer-readable storage medium 730. In alternative embodiments, some or all of the functionality may be provided by the processing circuitry 715 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 715 alone or to other components of UE 700, but are enjoyed by the wireless device as a whole, and/or by end users and the wireless network generally.

Antenna 705, radio front-end circuitry 710, and/or processing circuitry 715 may be configured to perform any receiving operations described herein as being performed by a wireless device. Any information, data and/or signals may be received from a network node and/or another wireless device.

The processing circuitry 715 may be configured to perform any determining operations described herein as being performed by a wireless device. Determining as performed by processing circuitry 715 may include processing information obtained by the processing circuitry 715 by, for example, converting the obtained information into other information, comparing the obtained information or converted information to information stored in the wireless device, and/or performing one or more operations based on the obtained information or converted information, and as a result of said processing making a determination.

Antenna 705, radio front-end circuitry 710, and/or processing circuitry 715 may be configured to perform any transmitting operations described herein as being performed by a wireless device. Any information, data and/or signals may be transmitted to a network node and/or another wireless device.

Computer-readable storage medium 730 is generally operable to store instructions, such as a computer program, software, an application including one or more of logic, rules, code, tables, etc. and/or other instructions capable of being executed by a processor. Examples of computer-readable storage medium 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 715. In some embodiments, processing circuitry 715 and computer-readable storage medium 730 may be considered to be integrated.

Alternative embodiments of UE 700 may include additional components beyond those shown in the FIG. 7 that may be responsible for providing certain aspects of the UE's functionality, including any of the functionality described herein and/or any functionality necessary to support the solution described above. As just one example, UE 700 may include input interfaces, devices and circuits, and output interfaces, devices and circuits. Input interfaces, devices, and circuits are configured to allow input of information into UE 700, and are connected to processing circuitry 715 to allow processing circuitry 715 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 700, and are connected to processing circuitry 715 to allow processing circuitry 715 to output information from UE 700. For example, output interfaces, devices, or circuits may include a speaker, a display, vibrating circuitry, a USB port, a headphone interface, or other output elements. Using one or more input and output interfaces, devices, and circuits, UE 700 may communicate with end users and/or the wireless network, and allow them to benefit from the functionality described herein.

As another example, UE 700 may include power source 735. Power source 735 may comprise power management circuitry. Power source 735 may receive power from a power supply, which may either be comprised in, or be external to, power source 735. For example, UE 700 may comprise a power supply in the form of a battery or battery pack which is connected to, or integrated in, power source 735. Other types of power sources, such as photovoltaic devices, may also be used. As a further example, UE 700 may be connectable to an external power supply (such as an electricity outlet) via an input circuitry or interface such as an electrical cable, whereby the external power supply supplies power to power source 735. Power source 735 may be connected to radio front-end circuitry 710, processing circuitry 715, and/or computer-readable storage medium 730 and be configured to supply UE 700, including processing circuitry 715, with power for performing the functionality described herein.

UE 700 may also include multiple sets of processing circuitry 715, computer-readable storage medium 730, radio circuitry 710, and/or antenna 705 for different wireless technologies integrated into wireless device 700, such as, for example, GSM, WCDMA, LTE, NR, Wi-Fi, or Bluetooth wireless technologies. These wireless technologies may be integrated into the same or different chipsets and other components within wireless device 700.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the disclosed figures. For example, storage 603 may comprise computer readable means on which a computer program can be stored. The computer program may include instructions which cause processor 602 (and any operatively coupled entities and devices, such as interface 6oi and storage 603) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 612 and/or 602, possibly in cooperation with storage 613 and/or 603. Processors 612 and/or 602 and storage 613 and/or 603 may thus be arranged to allow processors 612 and/or 602 to fetch instructions from storage 613 and/or 603 and execute the fetched instructions to allow the respective functional module to perform any steps or functions disclosed herein.

Numbered Example Embodiments

The technology described in this disclosure thus encompasses without limitation the following numbered example embodiments (E):

E1. An example embodiment in a terminal for determining whether said terminal is allowed to camp on a cell, characterized by acquiring a first part of the system information broadcast by the cell to determine whether it is allowed to camp on the cell or, if said first part of said system information does not explicitly allow this, whether said UE is required to acquire a second part of the system information and to determine based on said second part of the system information whether it is allowed to access said cell.

E2. An example embodiment according to embodiment E1, wherein said first part of said system information comprises a partial list of PLMN IDs E3. An example embodiment according to embodiment E1 or E2, wherein said second part of the system information comprises a second partial list of PLMN IDs.

E4. An example embodiment according to embodiment E1 or E2, wherein said second part of the system information comprises a complete list of PLMN IDs.

E5. An example embodiment according to any of the preceding embodiments, wherein said first part of said system information comprises hash values of PLMN IDs.

E6. An example embodiment according to any of the preceding embodiments, wherein said first part of the system information indicates that said second part of said system information is available upon request.

E7. An example embodiment according to any of the preceding embodiments, wherein said UE requests said second part of the system information only if it was not able to verify based on said first part of said system information that it is allowed to camp on the cell and if said first part of said system information indicates that the UE may request said second part of said system information.

E8. A method in a wireless device for establishing connectivity and receiving data from a communication network, wherein said wireless device is configured to:
    acquiring first system information associated with a cell and broadcasted from a wireless access point in the communication network,
    determining if the wireless device is allowed to access said cell based on the acquired first system information,
    acquiring a second part of system information associated with said cell and transmitted from said wireless access point in the communication network,
    determining if the wireless device is allowed to access said cell based on the acquired second system information.

E9. A wireless device for establishing connectivity, receiving and transmitting data to and from a communication network, said wireless device comprising transceiver circuitry, memory circuitry and processing circuitry, wherein the processing circuitry is configured to control the memory and transceiver circuitry to:
    acquire first system information associated with a cell and broadcasted from a wireless access point in the communication network,
    determine if the wireless device is allowed to access said cell based on the acquired first system information,
    acquire a second part of system information associated with said cell and transmitted from said wireless access point in the communication network,
    determine if the wireless device is allowed to access said cell based on the acquired second system information.

E10. A Network Node for establishing connectivity and receiving data to and from a wireless device, said network node comprising transceiver circuitry, memory circuitry and processing circuitry, wherein the processing circuitry is configured to control the memory and transceiver circuitry to:
    broadcasting first system information associated with a cell,
    determine if the wireless device is allowed to access said cell based on the acquired first system information,
    acquire a second part of system information associated with said cell and transmitted from said wireless access point in the communication network,
    determine if the wireless device is allowed to access said cell based on the acquired second system information.

E11. A method in a wireless device for receiving at least one PLMN ID, comprising the steps of:
    receiving Minimum System Information broadcasted from a radio base station in a radio network comprising a PLMN ID list and an indication that at least one additional PLMN is supported by said radio network,
    receiving Other System Information transmitted from the radio base station comprising said at least one additional PLMN ID.

E12. The method according to embodiment En, further comprising he step:
    send a request for said Other System Information if said indication indicates that additional PLMNs are supported by the radio base station.

E13. A wireless device for receiving a PLMN ID, said wireless device comprising transceiver circuitry, memory circuitry and processing circuitry, wherein the processing circuitry is configured to control the memory and transceiver circuitry to:
    receive Minimum System Information broadcasted from a radio base station in a radio network comprising a PLMN ID list and an indication that at least one additional PLMN is supported by said radio network,
    receive Other System Information transmitted from the radio base station comprising said at least one additional PLMN ID.

E14. The wireless device according to embodiment E13, wherein the processing circuitry is configured to control the memory and transceiver circuitry to:
    send a request for said Other System Information if said indication indicates that additional PLMNs are supported by the radio base station.

E15. A method in Network Node for establishing connectivity and receiving data to and from a wireless device, said network node comprising transceiver circuitry, memory circuitry and processing circuitry, comprising the steps of:
    broadcasting Minimum System Information comprising a PLMN ID list and an indication that at least one additional PLMN is supported by said radio network,
    receiving a request for Other System Information from a wireless device,
    transmitting Other System Information comprising said at least one additional PLMN ID to said wireless device.

E16. A Network Node for establishing connectivity and receiving data to and from a wireless device, said network node comprising transceiver circuitry, memory circuitry and processing circuitry, wherein the processing circuitry is configured to control the memory and transceiver circuitry to:
    broadcast Minimum System Information comprising a PLMN ID list and an indication that at least one additional PLMN is supported by said radio network, receive a request for Other System Information from a wireless device, transmit Other System Information comprising said at least one additional PLMN ID to said wireless device.

E17. A wireless device for accessing a radio network, said wireless device comprising transceiver circuitry, memory circuitry and processing circuitry, wherein the processing circuitry is configured to control the memory and transceiver circuitry to:

receive Minimum System Information broadcasted from a radio base station in a radio network comprising a PLMN ID list and an indication that at least one additional PLMN is supported by said radio network, access the radio network, if any of the PLMN IDs received corresponds to an allowed PLMN ID, corresponding to the allowed PLMN ID, send a request for said Other System Information if said indication indicates that additional PLMNs are supported by the radio base station and no PLMN ID received in the Minimum System Information corresponded to an allowed PLMN ID, receive Other System Information transmitted from the radio base station comprising said at least one additional PLMN ID, access the radio network corresponding to an allowed PLMN ID, if the at least one additional PLMN ID corresponds to the allowed PLMN ID.

E18. A method in a wireless device for accessing a radio access network comprising the steps of:

receiving Minimum System Information broadcasted from a radio base station in a radio network comprising a PLMN ID list, accessing the radio network if any of the PLMN IDs received corresponds to an allowed PLMN ID, sending a request for Other System Information if no PLMN ID received in the Minimum System Information corresponded to an allowed PLMN ID, receiving Other System Information transmitted from the radio base station comprising said at least one additional PLMN ID.

E19. The method according to embodiment E18, wherein the PLMN ID list comprises identifications of PLMNs supported by the radio base station.

E20. A wireless device for accessing a radio network, said wireless device comprising transceiver circuitry, memory circuitry and processing circuitry, wherein the processing circuitry is configured to control the memory and transceiver circuitry to:

receiving Minimum System Information broadcasted from a radio base station in a radio network comprising a PLMN ID list, accessing the radio network if any of the PLMN IDs received corresponds to an allowed PLMN ID, sending a request for Other System Information if no PLMN ID received in the Minimum System Information corresponded to an allowed PLMN ID, receiving Other System Information transmitted from the radio base station comprising said at least one additional PLMN ID.

E21. A method in a wireless device for determining if said wireless device is allowed to access a radio access network comprising the steps of:

receiving Minimum System Information broadcasted from a radio base station in a radio network comprising a list of compressed PLMN IDs, matching a compressed version of PLMN IDs, allowed to be accessed by said wireless device, with each item in said list of compressed PLMN IDs received from said radio base station, sending a request, if a match is found, for an uncompressed PLMN ID of the matched compressed PLMN ID to said radio base station, receiving said uncompressed PLMN ID, accessing the radio network corresponding to an allowed PLMN ID.

E22. The method according to embodiment E21, wherein the PLMN IDs are compressed using a hash function, by taking the least significant bits of the PLMN ID, using a Bloom filter.

E23. A method in a network node for comprising the steps of:

broadcasting Minimum System comprising a list of compressed PLMN IDs, receiving a request from a wireless device for an uncompressed PLMN ID, transmitting said uncompressed PLMN ID to said wireless device.

E24. The method according to embodiment E23, wherein the PLMN IDs are compressed using a hash function, by taking the least significant bits of the PLMN ID, using a Bloom filter.

E25. A Network Node for establishing connectivity and receiving data to and from a wireless device, said network node comprising transceiver circuitry, memory circuitry and processing circuitry, wherein the processing circuitry is configured to control the memory and transceiver circuitry to:

broadcast Minimum System comprising a list of compressed PLMN IDs, receive a request from a wireless device for an uncompressed PLMN ID, transmit said uncompressed PLMN ID to said wireless device.

E26. A wireless device for accessing a radio network, said wireless device comprising transceiver circuitry, memory circuitry and processing circuitry, wherein the processing circuitry is configured to control the memory and transceiver circuitry to:

receive Minimum System Information broadcasted from a radio base station in a radio network comprising a list of compressed PLMN IDs, match a compressed version of PLMN IDs, allowed to be accessed by said wireless device, with each item in said list of compressed PLMN IDs received from said radio base station, send a request, if a match is found, for an uncompressed PLMN ID of the matched compressed PLMN ID to said radio base station, receive said uncompressed PLMN ID, access the radio network corresponding to an allowed PLMN ID.

E27. The wireless device according to embodiment E26, wherein the PLMN IDs are compressed using a hash function, by taking the least significant bits of the PLMN ID or using a Bloom filter.

E28. A method in a communication system for providing data communication between a service provider and a wireless device, comprising first communications interface, first processing circuitry, second communications interface and second processing circuitry, wherein said first processing circuitry is configured to control said first communications interface to send and receive data to and from said second communications interface, said second processing circuitry is configured to control said second communications interface to send and receive data to and from said first communications interface, and wherein said second processing circuitry is configured to execute the steps of:
- receiving Minimum System Information broadcasted from a radio base station in a radio network comprising a PLMN ID list,
- accessing the radio network if any of the PLMN IDs received corresponds to an allowed PLMN ID,
- sending a request for Other System Information if no PLMN ID received in the Minimum System Information corresponded to an allowed PLMN ID,
- receiving Other System Information transmitted from the radio base station comprising said at least one additional PLMN ID.

E29. A method in a communication system for providing data communication between a service provider and a wireless device, comprising first communications interface, first processing circuitry, second communications interface and second processing circuitry, wherein
said first processing circuitry is configured to control said first communications interface to send and receive data to and from said second communications interface, said second processing circuitry is configured to control said second communications interface to send and receive data to and from said first communications interface, and wherein said second processing circuitry is configured to execute the steps of any of the methods in a wireless device disclosed above.

E30. A communication system for providing data communication between a service provider and a wireless device, comprising first communications interface, first processing circuitry, second communications interface and second processing circuitry, wherein
said first processing circuitry is configured to control said first communications interface to send and receive data to and from said second communications interface, said second processing circuitry is configured to control said second communications interface to send and receive data to and from said first communications interface, and wherein said second processing circuitry is configured to:
- receive Minimum System Information broadcasted from a radio base station in a radio network comprising a PLMN ID list,
- access the radio network if any of the PLMN IDs received corresponds to an allowed PLMN ID,
- send a request for Other System Information if no PLMN ID received in the Minimum System Information corresponded to an allowed PLMN ID,
- receive Other System Information transmitted from the radio base station comprising said at least one additional PLMN ID.

E31. A communication system for providing data communication between a service provider and a wireless device, comprising first communications interface, first processing circuitry, second communications interface and second processing circuitry, wherein
said first processing circuitry is configured to control said first communications interface to send and receive data to and from said second communications interface, said second processing circuitry is configured to control said second communications interface to send and receive data to and from said first communications interface, and wherein said second processing circuitry and said second communications interface is arranged in, and configured according to any of the wireless device disclosed above.

E.32 A method in a wireless device for accessing a communication network comprising the steps of:
- receiving 210 minimum system information associated with a cell and broadcasted from a network node in the communication network, wherein the minimum system information comprises a Public Land Mobile Network identity, PLMN ID, list and an indication that at least one additional PLMN is supported by said communication network,
- accessing 230 the communication network if any of the PLMN IDs in the received minimum system information corresponds to an allowed PLMN ID, and
- sending 240 a request for on-demand system information comprising said at least one additional PLMN to the network node if no PLMN ID received in the minimum system information corresponds to an allowed PLMN ID.

E33. The method according to embodiment E32, wherein the method further comprises the steps of:
- receiving 360 the requested on-demand system information transmitted from the network node, and
- accessing 230 the communication network if any of the at least one additional PLMN IDs in the received on-demand system information corresponds to an allowed PLMN ID.

E34. The method according to any of the embodiments E32 or E33, wherein the PLMN IDs in the minimum system information are compressed and wherein the step of accessing 230 the communication network if any of the PLMN IDs in the received list corresponds to an allowed PLMN ID comprises the steps of:
- matching a compressed version of PLMN IDs, allowed to be accessed by said wireless device, with each item in said list of compressed PLMN IDs received from said network node,
- sending a request, if a match is found, for an uncompressed PLMN ID of the matched compressed PLMN ID to said network node,
- receiving said uncompressed PLMN ID from said network node, and
- accessing the communication network corresponding to an allowed PLMN ID.

E35. The method according to embodiment E34, wherein the PLMN IDs are compressed using a hash function, by taking the least significant bits of the PLMN ID, using a Bloom filter.

E36. The method according to any of the embodiments E32-E35, wherein the request for on-demand system information is a Physical Random Access Channel, PRACH, preamble.

E37. A wireless device for accessing a communication network, said wireless device comprising transceiver circuitry, memory circuitry and processing circuitry, wherein the processing circuitry is configured to control the memory and transceiver circuitry to:
- receive minimum system information associated with a cell and broadcasted from a network node in the communication network, wherein the minimum system information comprises a Public Land Mobile Network identity, PLMN ID, list and an indication that at least one additional PLMN is supported by said communication network,
- access the communication network if any of the PLMN IDs in the received minimum system information corresponds to an allowed PLMN ID, and send a request for on-demand system information comprising said at least one additional PLMN to the network node if no PLMN ID received in the minimum system information corresponds to an allowed PLMN ID.

E38. The wireless device according to embodiment E37, wherein the processing circuitry is further configured to control the memory and the transceiver circuitry to:
receive the requested on-demand system information transmitted from the network node, and
access the communication network if any of the at least one additional PLMN IDs in the received on-demand system information corresponds to an allowed PLMN ID.

E39. The wireless device according to any of the embodiments E37 or E38, wherein the PLMN IDs in the minimum system information are compressed and wherein the processing circuitry is further configured to control the memory and the transceiver circuitry to access the communication network if any of the PLMN IDs in the received list corresponds to an allowed PLMN ID by:
match a compressed version of PLMN IDs, allowed to be accessed by said wireless device, with each item in said list of compressed PLMN IDs received from said network node,
send a request, if a match is found, for an uncompressed PLMN ID of the matched compressed PLMN ID to said network node,
receive said uncompressed PLMN ID from said network node, and
access the communication network corresponding to an allowed PLMN ID.

E40. The wireless device according to embodiment E39, wherein the PLMN IDs are compressed using a hash function, by taking the least significant bits of the PLMN ID, using a Bloom filter.

E41. The wireless device according to any of the embodiments E37-E40, wherein the request for on-demand system information is a Physical Random Access Channel, PRACH, preamble.

E42. The wireless device according to any of the embodiments E37-E41, wherein the wireless device is a User Equipment, UE.

E43. A method in a network node for establishing connectivity and receiving data to and from a wireless device comprising the steps of:
broadcasting minimum system information comprising a Public Land Mobile Network identity, PLMN ID, list and an indication that at least one additional PLMN is supported by said communication network,
receiving a request for on-demand system information from a wireless device, and
transmitting the requested on-demand system information comprising said at least one additional PLMN ID to said wireless device.

E44. The method according to embodiment E43, wherein the PLMN IDs in the minimum system information are compressed and wherein the step of broadcasting minimum system information comprises the steps of:
broadcasting the minimum system information comprising the list of compressed PLMN IDs,
receiving a request from the wireless device for an uncompressed PLMN ID, and
transmitting said uncompressed PLMN ID to said wireless device.

E45. The method according to embodiment E44, wherein the PLMN IDs are compressed using a hash function, by taking the least significant bits of the PLMN ID, using a Bloom filter.

E46. The method according to any of the embodiments E43-E45, wherein the on-demand system information comprises a full list of all PLMN IDs duplicating ones present also in the minimum system information.

E47. A network node for establishing connectivity and receiving data to and from a wireless device, said network node comprising transceiver circuitry, memory circuitry and processing circuitry, wherein the processing circuitry is configured to control the memory and transceiver circuitry to:
broadcast minimum system information comprising a PLMN ID list and an indication that at least one additional PLMN is supported by said communication network,
receive a request for on-demand system information from a wireless device, and
transmit the requested on-demand system information comprising said at least one additional PLMN ID to said wireless device.

E48. The network node according to embodiment 47, wherein the PLMN IDs in the minimum system information are compressed and wherein the processing circuitry is further configured to control the memory and the transceiver circuitry to broadcast the minimum system information comprising the list of compressed PLMN IDs by:
broadcast the minimum system information comprising the list of compressed PLMN IDs,
receive a request from the wireless device for an uncompressed PLMN ID, and
transmit said uncompressed PLMN ID to said wireless device.

E49. The network node according to embodiment 48, wherein the PLMN IDs are compressed using a hash function, by taking the least significant bits of the PLMN ID, using a Bloom filter.

E50. The network node according to any of the embodiments E47-E49, wherein the on-demand system information comprises a full list of all PLMN IDs duplicating ones present also in the minimum system information.

E51. The network node according to any of the embodiments E47-E50, wherein the network node is a gNB.

E52. A method in a communication system for providing data communication between a service provider and a wireless device, comprising first communications interface, first processing circuitry, second communications interface and second processing circuitry, wherein
said first processing circuitry is configured to control said first communications interface to send and receive data to and from said second communications interface, said second processing circuitry is configured to control said second communications interface to send and receive data to and from said first communications interface, and wherein said second processing circuitry is configured to execute the steps of the method in the wireless device according to any of embodiments E32-E36.

E53. A communication system for providing data communication between a service provider and a wireless device, comprising first communications interface, first processing circuitry, second communications interface and second processing circuitry, wherein
said first processing circuitry is configured to control said first communications interface to send and receive data to and from said second communications interface, said second processing circuitry is configured to control said second communications interface to send and receive data to and from said first communications interface, and wherein said second processing circuitry and said second communications interface is arranged in, and configured according to the wireless device according to any of embodiments E37-E42.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method in a wireless device for accessing a communication network, comprising:
   receiving minimum system information associated with a cell and broadcasted from a network node in the communication network, wherein the minimum system information includes identities (IDs) of one or more Public Land Mobile Networks (PLMNs) supported by the communication network and an indication that at least one additional PLMN is supported by the communication network;
   accessing the communication network if any of the PLMN IDs in the minimum system information matches the PLMN ID of any PLMN the wireless device is allowed to access, where such PLMN IDs are referred to as allowed PLMN IDs; and
   sending a request for on-demand system information, if no PLMN ID received in the minimum system information corresponds to an allowed PLMN ID, wherein the on-demand system information includes at least one additional PLMN ID corresponding to the at least one additional PLMN supported by the communication network.

2. The method according to claim 1, wherein the method further comprises:
   receiving the on-demand system information from the network node; and
   accessing the communication network if any of the at least one additional PLMN ID in the on-demand system information corresponds to an allowed PLMN ID.

3. The method according to claim 1, wherein the PLMN IDs in the minimum system information are compressed and wherein accessing the communication network if any of the PLMN IDs in the minimum system information matches an allowed PLMN ID comprises:
   comparing a compressed version of each allowed PLMN ID with each one of the compressed PLMN IDs in the minimum system information;
   sending a request to the network node, if a match is found, for an uncompressed PLMN ID of the matched compressed PLMN ID;
   receiving the uncompressed PLMN ID from the network node; and
   accessing the communication network according to the uncompressed PLMN ID.

4. The method according to claim 3, wherein the PLMN IDs are compressed using a hash function, by taking the least significant bits of each of the PLMN IDs, using a Bloom filter.

5. The method according to claim 1, wherein the request for on-demand system information is a Physical Random Access Channel (PRACH) preamble.

6. A wireless device configured for accessing a communication network, the wireless device comprising transceiver circuitry, memory circuitry and processing circuitry, wherein the processing circuitry is configured to control the memory and transceiver circuitry to:
   receive minimum system information associated with a cell and broadcasted from a network node in the communication network, wherein the minimum system information includes identities (IDs) of one or more Public Land Mobile Networks (PLMNs) supported by the communication network and an indication that at least one additional PLMN is supported by the communication network;
   access the communication network if any of the PLMN IDs in the minimum system information matches the PLMN ID of any PLMN the wireless device is allowed to access, where such PLMN IDs are referred to as allowed PLMN IDs; and
   send a request for on-demand system information, if no PLMN ID received in the minimum system information corresponds to an allowed PLMN ID, wherein the on-demand system information includes at least one additional PLMN ID corresponding to the at least one additional PLMN supported by the communication network.

7. The wireless device according to claim 6, wherein the processing circuitry is further configured to control the memory and the transceiver circuitry to:
   receive the on-demand system information from the network node; and
   access the communication network if any of the at least one additional PLMN ID in the on-demand system information corresponds to an allowed PLMN ID.

8. The wireless device according to claim 6, wherein the PLMN IDs in the minimum system information are compressed and wherein the processing circuitry is further configured to control the memory and the transceiver circuitry to access the communication network if any of the PLMN IDs in the minimum system information matches an allowed PLMN ID by:
   comparing a compressed version of each allowed PLMN ID with each one of the compressed PLMN IDs in the minimum system information;
   sending a request to the network node, if a match is found, for an uncompressed PLMN ID of the matched compressed PLMN ID;
   receiving the uncompressed PLMN ID from the network node; and
   accessing the communication network.

9. The wireless device according to claim 8, wherein the PLMN IDs are compressed using a hash function, by taking the least significant bits of each of the PLMN IDs, using a Bloom filter.

10. The wireless device according to claim 6, wherein the request for on-demand system information is a Physical Random Access Channel (PRACH) preamble.

11. The wireless device according to claim 6, wherein the wireless device is a User Equipment (UE).

12. A method in a network node for establishing connectivity and receiving data to and from a wireless device comprising:
- broadcasting minimum system information comprising identities (IDs) of one or more Public Land Mobile Networks (PLMNs) supported by the communication network and an indication that at least one additional PLMN is supported by the communication network;
- receiving a request for on-demand system information from a wireless device; and
- transmitting the on-demand system information to the wireless device, wherein the on-demand system information includes at least one additional PLMN ID corresponding to the at least one additional PLMN supported by the communication network.

13. The method according to claim 12, wherein the PLMN IDs in the minimum system information are compressed and wherein broadcasting the minimum system information comprises:
- broadcasting the minimum system information comprising the compressed PLMN IDs;
- receiving a request from the wireless device for an uncompressed PLMN ID; and
- transmitting the uncompressed PLMN ID to the wireless device.

14. The method according to claim 13, wherein each of the PLMN IDs are compressed using a hash function, by taking the least significant bits of each of the PLMN IDs, using a Bloom filter.

15. The method according to claim 12, wherein the on-demand system information comprises a full list of all PLMN IDs duplicating ones present also in the minimum system information.

16. A network node configured for establishing connectivity and receiving data to and from a wireless device, the network node comprising transceiver circuitry, memory circuitry and processing circuitry, wherein the processing circuitry is configured to control the memory and transceiver circuitry to:
- broadcast minimum system information comprising identities (IDs) of one or more Public Land Mobile Networks (PLMNs) supported by the communication network and an indication that at least one additional PLMN is supported by the communication network;
- receive a request for on-demand system information from a wireless device; and
- transmit the on-demand system information to the wireless device, wherein the on-demand system information includes at least one additional PLMN ID corresponding to the at least one additional PLMN supported by the communication network.

17. The network node according to claim 16, wherein the PLMN IDs in the minimum system information are compressed and wherein the processing circuitry is further configured to control the memory and the transceiver circuitry to broadcast the minimum system information comprising the compressed PLMN IDs by:
- broadcasting the minimum system information comprising the compressed PLMN IDs;
- receiving a request from the wireless device for an uncompressed PLMN ID; and
- transmit the uncompressed PLMN ID to the wireless device.

18. The network node according to claim 17, wherein each of the PLMN IDs are compressed using a hash function, by taking the least significant bits of each of the PLMN ID, using a Bloom filter.

19. The network node according to claim 16, wherein the on-demand system information comprises a full list of all PLMN IDs duplicating ones present also in the minimum system information.

20. The network node according to claim 16, wherein the network node is a gNB.

* * * * *